(12) United States Patent
Boucard et al.

(10) Patent No.: US 9,069,912 B2
(45) Date of Patent: Jun. 30, 2015

(54) SYSTEM AND METHOD OF DISTRIBUTED INITIATOR-LOCAL REORDER BUFFERS

(75) Inventors: Philippe Boucard, Le Chesnay (FR); Jean-Jacques Lecler, Cupertino, CA (US)

(73) Assignee: Qualcomm Technologies, Inc., San Diego, CA (US)

( * ) Notice: Subject to any disclaimer, the term of this patent is extended or adjusted under 35 U.S.C. 154(b) by 236 days.

(21) Appl. No.: 13/436,944

(22) Filed: Mar. 31, 2012

(65) Prior Publication Data
US 2013/0262733 A1 Oct. 3, 2013

(51) Int. Cl.
G06F 13/36 (2006.01)
G06F 13/40 (2006.01)
G06F 13/22 (2006.01)

(52) U.S. Cl.
CPC ........ *G06F 13/4059* (2013.01); *G06F 13/4031* (2013.01); *G06F 13/22* (2013.01)

(58) Field of Classification Search
CPC .. G06F 13/22; G06F 13/4059; G06F 13/4031
USPC ................................ 710/104–110, 306–311
See application file for complete search history.

(56) References Cited

U.S. PATENT DOCUMENTS

| | | | |
|---|---|---|---|
| 5,883,814 A | 3/1999 | Luk et al. | |
| 6,834,314 B1 * | 12/2004 | Askar | 710/5 |
| 7,143,221 B2 * | 11/2006 | Bruce et al. | 710/113 |
| 7,162,546 B2 * | 1/2007 | Creta et al. | 710/5 |
| 7,457,905 B2 * | 11/2008 | Gehman | 710/315 |
| 2004/0010652 A1 | 1/2004 | Adams et al. | |
| 2004/0024948 A1 * | 2/2004 | Winkler et al. | 710/311 |
| 2008/0040523 A1 | 2/2008 | Bruce | |
| 2009/0210836 A1 | 8/2009 | Phan | |
| 2009/0287865 A1 | 11/2009 | Aldworth et al. | |
| 2011/0106991 A1 * | 5/2011 | Kawahito | 710/110 |
| 2012/0079154 A1 * | 3/2012 | Mangano et al. | 710/112 |
| 2012/0131246 A1 * | 5/2012 | Jeong et al. | 710/110 |

FOREIGN PATENT DOCUMENTS

WO 2011047368 A2 4/2011

* cited by examiner

*Primary Examiner* — Raymond Phan
(74) *Attorney, Agent, or Firm* — Muncy, Geissler, Olds & Lowe, P.C.

(57) ABSTRACT

A Network-on-Chip (NoC) is provided that performs reordering of transaction responses such as those with requests that cross address mapping boundaries. Ordering is ensured by filtering logic in reorder buffers, some of which include storage to allow multiple simultaneously pending transactions. Transactions are transported by a packet-based transport protocol. The reorder buffering is done at packet level, within the transport topology. Reorder buffers are distributed physically throughout the floorplan of the chip, they have localized connectivity to initiators, and they operate in separate power and clock domains.

14 Claims, 7 Drawing Sheets

SYSTEM AND METHOD OF DISTRIBUTED INITIATOR-LOCAL REORDER BUFFERS

FIELD OF THE INVENTION

The present invention disclosed is related to networking on a chip and, more specifically, to memory access within a system-on-chip.

BACKGROUND

Network-on-chip (NoC) is an increasingly popular technology for connecting the heterogeneous IPs within system-on-chip (SoC) integrated circuits. IPs have one or more master and/or slave bus interfaces, typically using industry standard protocols such as AMBA and OCP. Masters initiate read and write transactions, also referred to as bursts, through an initiator interface. Transactions issued using those protocols may have their requests responded to in any order unless the requests have the same ID, in which case they must be responded to in order. IDs are known as "tags" in the OCP protocol and "AIDs" in the AMBA AXI protocol The NoC transports the transactions to the connected target interfaces, which connect to the slaves. Some NoCs use a transport protocol that is different from the bus interfaces used to request transactions. Transactions are a communication layer above the transport. The transport of a transaction is done with one or more atomic transport packets.

A logic module called a network interface unit (NIU) converts between transactions at IP interfaces and transport protocol packets. An initiator NIU accepts request transactions and gives transaction responses to masters. A target NIU gives transaction requests and accepts transaction responses from slaves. The connectivity of initiator NIU and target NIU as well as intermediate modules such as routers, muxes, switches, and buffers are referred to as the topology of the NoC. The position of each interface or module within the NoC is referred to as its logical location within the topology.

The IPs that comprise the SoC are each constrained to a physical location within the chip by constraints such as form factor, the location of IO pads, power supply nets, and power down regions. The set of all location constraints in the chip are referred to as the floorplan. The initiator and target NIUs and all interconnected modules of the logical topology are distributed throughout the floorplan of the chip.

The target of a transaction is selected by the address given by the initiator. Within the chip, it is common that routes of data transfer exist for only some combinations of initiators and target. Furthermore, the specific range of addresses mapped to each target might be different for different initiators. The set of target address mappings for an initiator is referred to as the address space of the initiator.

The address of the transaction given by the initiator also specifies at which data byte, within the address range of the selected target, the transaction begins. The amount of data to access is also given by the initiator. That determines the range of data accessed from the beginning to the end of the transaction.

To complete the transaction the target interface gives a response. For a read transaction the response carries the data from the target to the initiator. For a write transaction the response simply carries an acknowledgement.

FIG. 1 shows an address space of an initiator. A first target is accessed within the range of mapping A and a second target is accessed within the adjacent range of mapping B. Mapping A and mapping B are adjacent and non-overlapping within the address space. A transaction request to an address shortly before the boundary between mapping A and mapping B with a large range will access data from both the first target and the second target. Because packets are atomic, this transaction will be split into at least two packets with at least one sent to the first target and at least one sent to the second target. The two packets will have the same ID as the original request and therefore must be responded to in order. The responses from the two targets are reassembled to complete the transaction. For a write transaction, reassembly is simply ensuring that an acknowledgement is received for each packet.

Such designs suffer two problems. First, the storage capacity of a Re-Order Buffer (ROB) determines the number of transactions that can be simultaneously pending from all initiators to all targets of split transactions. DRAM performance is best when a large number of transactions are pending in the scheduler. The configuration of a single ROB for the entire system, as ROB 204 is shown in FIG. 2, must have a large capacity and therefore consume a large area within the chip floorplan. Most advanced systems-on-chips (SoCs) have multiple power islands that can be independently powered down to reduce chip power consumption during low power operating modes. However, since most SoCs use DRAM most of the time, the ROB must remain powered up most of the time.

Second, the entire throughput of all DRAMs passes through the physical location of the ROB. Within a reasonable clock speed, a large throughput requires a wide datapath, consisting of a large number of connections. Since all initiators with connectivity to DRAM connect to the ROB, it is a point of physical wire routing congestion. This complicates the place & route and reduces manufacturability of the chip.

SUMMARY

The disclosed invention is a NoC and method for ensuring the correct ordering of responses to transactions and split portions of transactions. More than one ROB are distributed physically and in the logical topology as well as shared by a localized subset of initiators. ROBs are clock and power gated locally with their attached initiators, thereby maximizing the amount of logic that can be power gated in most operating modes. Furthermore, the invention requires less direct connectivity at each ROB, providing for easier place & route and superior manufacturability.

DETAILED DESCRIPTION

Drawings are intended to be illustrative, to those of skill in the art, of particular aspects of the invention and are not necessarily to scale, and each is not necessarily inclusive of all aspects.

Figure 5:
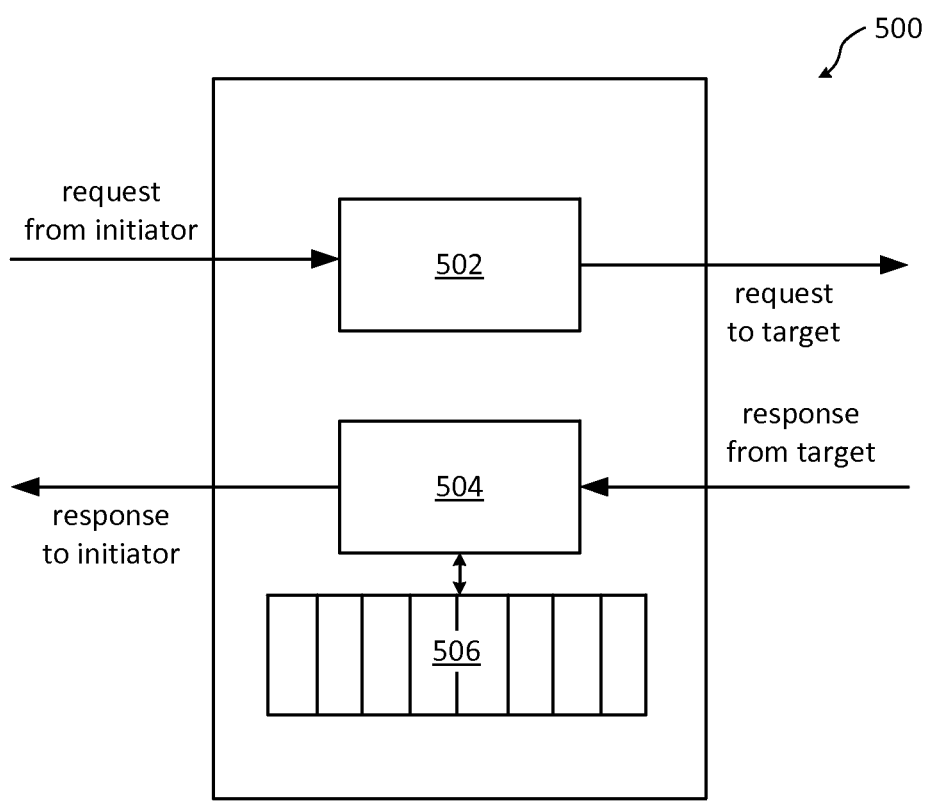
FIG. 5 illustrates the elements of a reorder buffer.

Consider that targets may respond with an unpredictable amount of delay. For a read transaction, reassembly requires storing, if required, the response data for the sequentially second and all succeeding packets such that each packet's response data is given to the initiator only after all sequentially preceding data is given. Such a module, for the purpose of correcting the order of read response data, is referred to as a reorder buffer (ROB). A generic ROB is shown in FIG. 5. It essentially comprises: a data input port for receiving requests from initiators; filtering logic for enforcing ordering rules; a data output port for sending requests to targets; a data input port for receiving transaction responses from a target; a storage array for storing data; a data output port for sending responses to an initiator; and reassembly logic that chooses which data to send and when to send it to the initiator.

Figure 1:
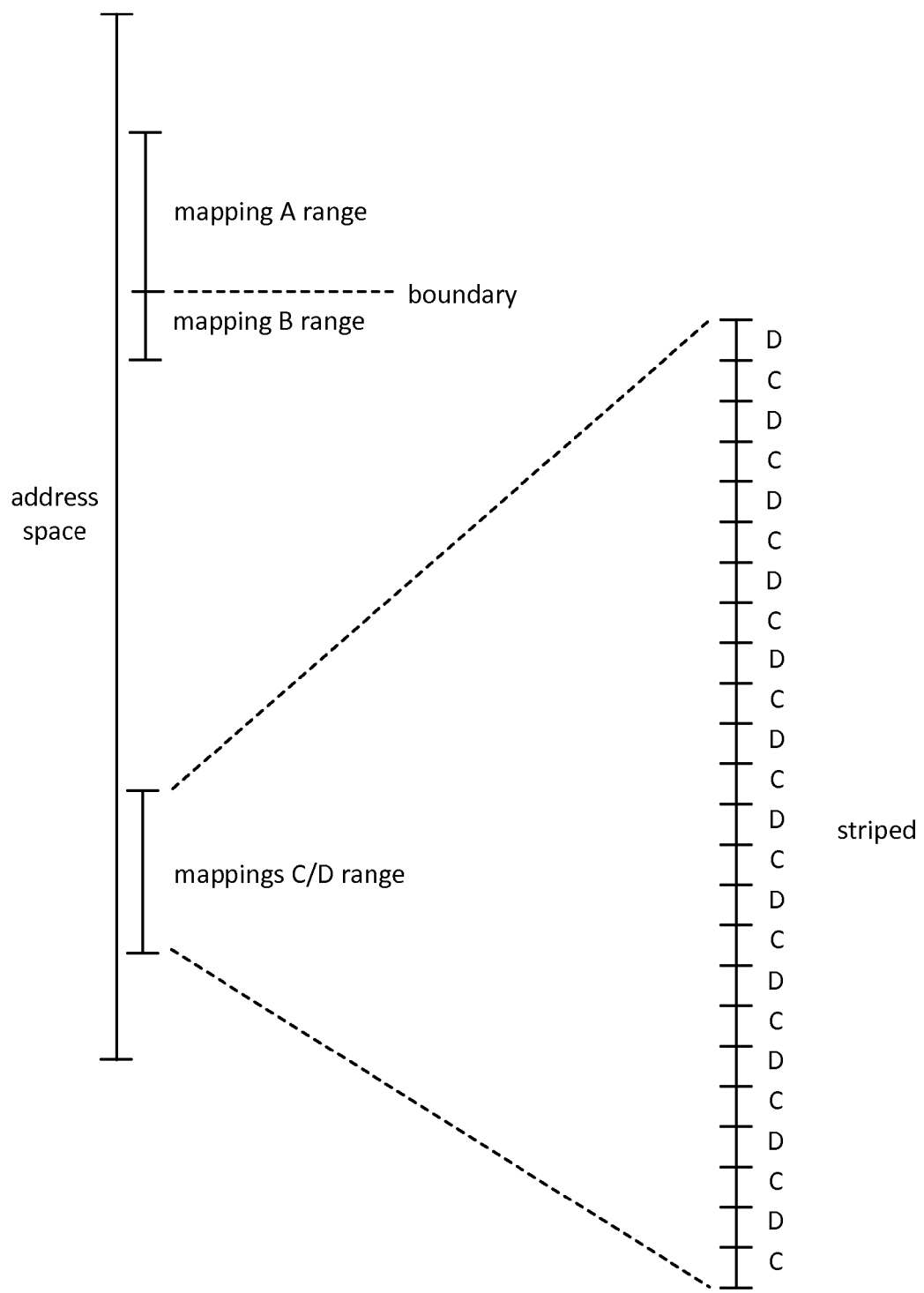
FIG. 1 illustrates four mappings within an address space.

In some address spaces it is beneficial to have a large number of address mappings interleaved to a small number of more than one targets. This is shown in FIG. 1 for mappings C and D. Such interleaving of mappings is referred to as striping. Striping is useful for evenly distributing the bandwidth needed for accessing large amounts of memory storage between multiple storage targets. The performance of many SoCs is determined by the bandwidth available to DRAM either through traditional board-level interfaces, between chips through package-on-package interfaces, or between chips directly using wide IO interfaces. It is increasingly common for SoCs to have multiple DRAM controllers (2 or 4 at board level or more using wide IO) and a central module that receives primary transaction requests, and if the primary transaction request spans multiple mappings then splits it into multiple secondary transaction requests, sends secondary transaction requests to the multiple DRAM controllers, stores responses in the ROB, and gives the response back to the initiator in order. Such a system is shown in FIG. 2 with initiators labeled "I" and targets labeled "T".

Structure

Figure 2:
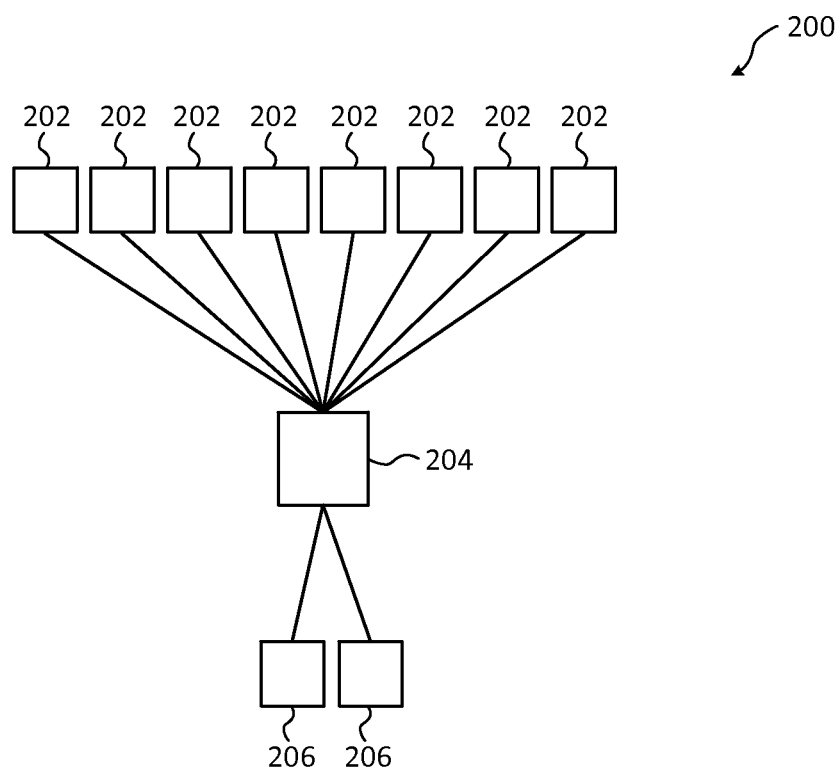
FIG. 2 illustrates the logical topology of a NoC with a central ROB.

Referring now to FIG. 2, a NoC 200 is shown with initiators 202. The convergence of so much connectivity at the physical location of a ROB 204 creates a high wire density in the region of the ROB 204. A high wire density complicates and potentially delays the design process and hinders manufacturability of the chip.

A characteristic of NoC technology is its use of a layered protocol approach to communication. Transactions are carried out at the logical edges of the NoC using transaction layer protocols while their information moves through the NoC using a lower layer transport protocol. The transport protocol comprises at least a route ID (derived from the transaction address) indicating the destination of the packet, an opcode indicating the type of transaction, an address of data to access within the target, and the size of the transaction. The use of a transport protocol enables the modular design of a NoC. That is, the NoC comprises a number of separable units that communicate using the transport protocol. A benefit of that approach is that the units that comprise the implementation of the NoC can be physically distributed throughout the floorplan of the chip as it benefits the physical constraints on the design. One such constraint is the density of wires within regions of the chip. In state of the art designs, many initiators are routed to the central ROB.

Figure 3:
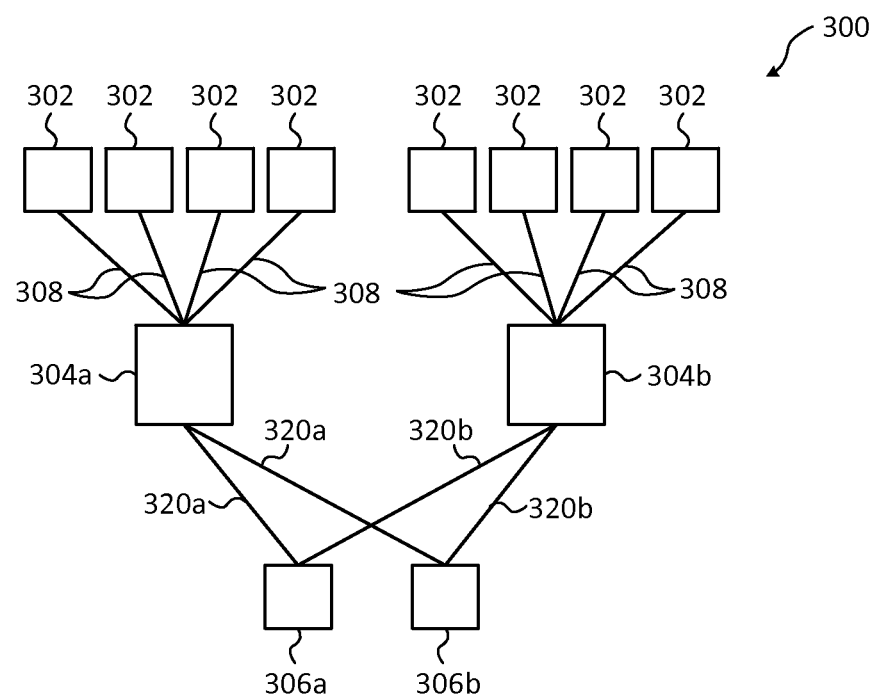
FIG. 3 illustrates a logical topology of a NoC with distributed ROBs in accordance with one aspect of the present invention.

Referring now to FIG. 3 a NoC 300 is shown to include initiators 302 and ROB 304a and 304b. By physically distributing the modules that comprise a NoC, less connectivity is needed. In accordance with one aspect of the present invention, the initiators 302 are connected to target 306a and target 306b through ROB 304a and ROB 304b, respectively. Each ROB 304 only has four initiator connections 308.

Figure 4:
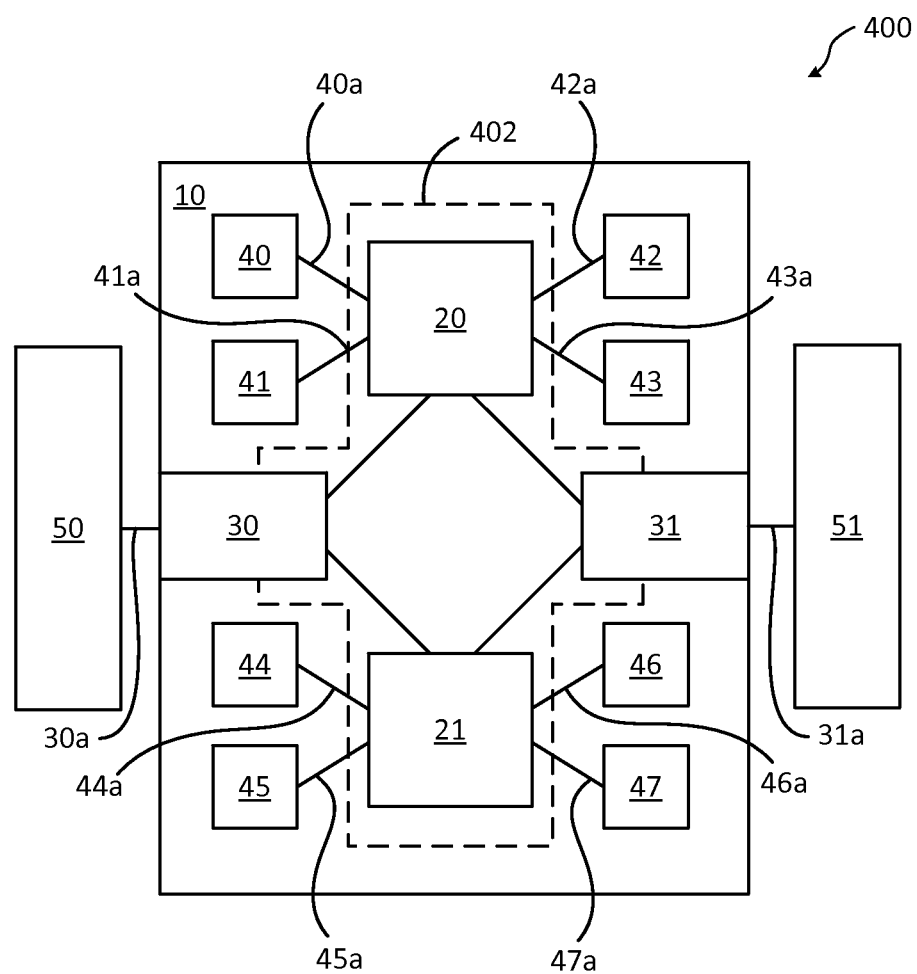
FIG. 4 illustrates the physical floorplan of a chip with distributed ROBs in accordance with one aspect of the present invention.

Referring now to FIG. 4, a physical floorplan 400 is shown that includes a NoC 402, which comprises the NoC 300 of FIG. 3. A chip 10 includes initiators 40, 41, 42, and 43 and sockets 40a, 41a, 42a, and 43a. The initiators 40, 41, 42, and 43 are connected to a ROB 20 through the sockets 40a, 41a, 42a, and 43a, respectively. The initiators 44, 45, 46, and 47 are connected to a ROB 21 through sockets 44a, 45a, 46a, and 47a, respectively. Both ROB 20 and ROB 21 are connected to both of a target 30 and a target 31. Each target 30 and target 31 is connected to a chip 50 and a chip 51 through sockets 30a and 31a, respectively.

In accordance with one aspect of the present invention, the ROBs are physically non-adjacent. The connectivity, and thereby the wire density, is reduced by the fact that the ROBs are physically spread out on the chip 10.

In accordance with one aspect of the present invention, the two ROBs are separate modules and each may be configured differently. Some parameters of the configuration that may differ between instances of ROBs are:

number of connected initiators—the number of initiators that make requests through the ROB;

buffer capacity—the amount of data that the ROB can store;

non-reordering behavior—the number of requests that can be pending simultaneously;

clock domain—the clock signal used for the ROB;

power domain—the power supply net and the branch of the clock tree that may be turned off during power saving modes of operation of the chip; and serialization—the width of the datapaths.

In accordance with one aspect of the present invention, if small low bandwidth initiators share a ROB, then it might be implemented with a narrow serialization and a slow clock. In accordance with one aspect of the present invention, the ROB for a high performance video processor initiator might be implemented in a power domain that is turned off during operating modes that do not use video.

The ability to distribute ROBs into separate power domains is particularly useful. The DRAM interfaces must be powered on whenever any initiator is accessing DRAM, even if the access requirements are low bandwidth. ROBs consume a significant amount of logic. Whereas a state of the art ROB is powered on much of the time, a large ROB for one or more initiators that are used only rarely can be powered off most of the time to save power while a small ROB can be used for the low bandwidth initiators that are on for much of the time.

Figure 6:
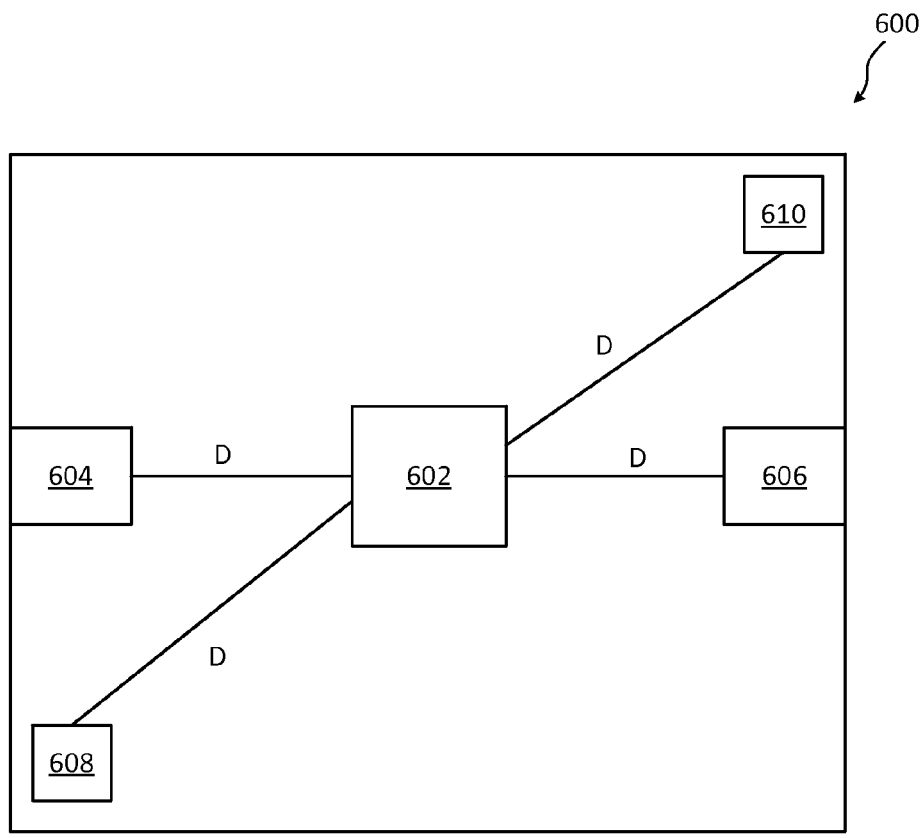
FIG. 6 illustrates a floorplan of a chip with a NoC with a centralized ROB.

Aside from saving idle power, a system of distributed ROBs reduces active power. Referring now to FIG. 6, a floorplan diagram of a NoC 600 is shown. The NoC 600 includes a centralized ROB 602, non-adjacent DDR controllers (DDRC) 604 and 606, and distant initiators 608 and 610. It is desirable to separate DDRC 604 and 606 physically to allow the controller logic to be close to its many connected pins at the edges of the chip without the pin congestion of two controllers close together. SoCs typically have many initiators located throughout the floorplan. In the NoC 600, all transactions requested by the initiators 608 and 610 traverse a distance D to the ROB 602 then a distance D again from the ROB 602 to one DDRC 604 or 608 the other for a total wire length distance of 2D.

Figure 7:
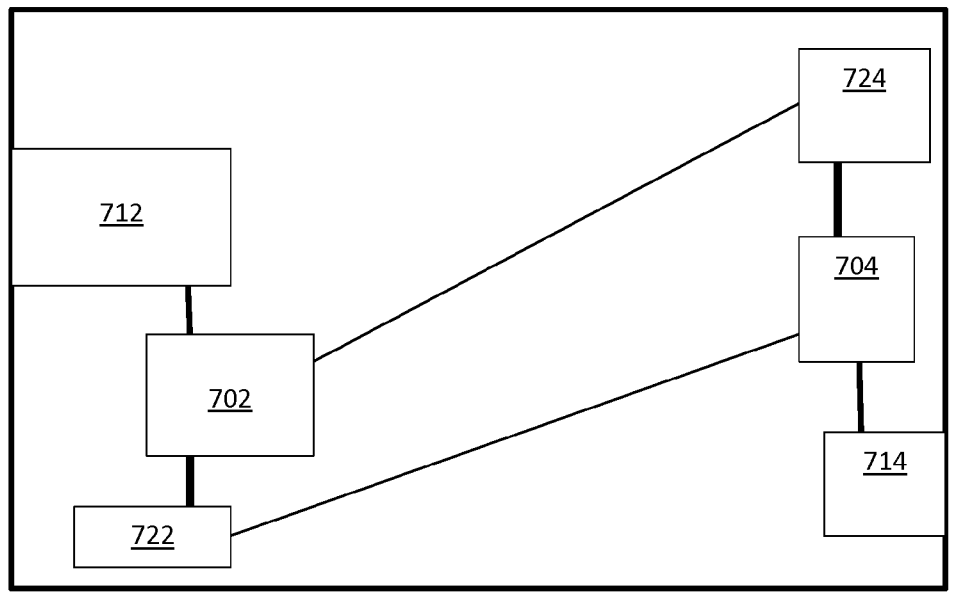
FIG. 7 illustrates a floorplan of a chip with a NoC with two distributed ROBs in accordance with one aspect of the present invention.

Referring now to FIG. 7, a floorplan diagram of a NoC 700 is shown in accordance with one aspect of the present invention. The NoC 700 includes a distributed ROB 702 and a distributed ROB 704, and distributed DDR controllers (DDRC) 712 and 714, and initiators 722 and 724. Transactions requested by initiator 724 to DDRC 712 traverse a distance 2D to ROB 702, which is adjacent to DDRC 712. Transactions requested by initiator 724 to DDRC 714 traverse negligible distance to ROB 704 and then to DDRC 714. Active power consumption is proportional to the length of wires times the amount of data transfer bandwidth over the wires. In one possible scenario, there is evenly distributed bandwidth B from initiator 724 to DDRC 712 and from initiator 724 to DDRC 714. The centralized ROB 602 of the NoC 600 of FIG. 6 has active power of B*2D for transactions from initiator 610. The distributed ROB 702 and 704 of NoC 700 of FIG. 7 has active power of ½ B*2D. For that reason, a NoC with distributed ROBs located close to their connected initiators and targets uses less power than a state of the art NoC with a centralized ROB.

An optimal design of distributed ROBs has the further advantage of reducing average target access latency. Given that transactions traversing the chip typically require additional cycles of pipeline buffers to meet fast clock periods, all initiator requests from the initiator 610 of the NoC 600 of FIG. 6 must traverse a total distance 2D. For initiator 724 in the NoC 700 of FIG. 7 ½ of requests incur no latency as a result of long distance wires. Only ½ of the requests incur the 2D latency penalty. Thereby, the average latency encountered by transactions from initiators in a NoC with distributed ROBs is less than with a centralized ROB.

Referring now to FIG. 5, in accordance with various aspects of the present invention, a ROB 500 includes filtering logic 502, storage 506, and response reassembly logic 508. The filtering logic 502 is used for issuing requests and the reassembly logic 508 is used for assembling responses. The filtering logic 502 enforces the ordering rules of the protocol by issuing requests within each ordered sequence either such that there is only one pending at a time or such that there are no more pending than the amount of buffering storage 506 required to reorder the responses if the sequentially first response is last to be received. In accordance with one aspect of the present invention, while filtering logic 502 is required to enforce the ordering rules of the protocol, the storage 506 and reassembly logic 508 are optional. Without the storage 506 and reassembly logic 508, a read spanning two or more address mappings is handled by making a request to the first target; waiting for its response; making a request to the second target; waiting for its response and so on until the full read has completed. Many initiators make requests with sufficiently low frequency and with sufficiently low bandwidth and relaxed latency requirements that the extra time required to process the multiple requests of a read spanning two or more mappings without storage is within allowable design constraints. Having the storage 506 and reassembly logic 508 being optional has the advantage of allowing initiators or groups of initiators that do not require the performance advantage of parallel requests to be implemented with less logic. This saves total silicon area and reduces the amount of powered up logic.

In accordance with various aspects of the present invention, the disclosed invention is particularly useful in systems with striped address mappings because such address mappings have a particularly large number of boundaries between mappings. SoCs with striped mappings typically have interleaved stripes for a number of targets that is a power of two (i.e. 2, 4, 8, etc.). It is advantageous in some SoCs to have a number of interleaved stripes that is not a power of two. This would be the case when, for example, bandwidth requirement is greater than that available from two targets but not as much as the bandwidth available from four targets. In such a case, adding a fourth target would be unnecessarily expensive in silicon area and pins. The design approach of performing transaction filtering and response reassembly using distributed ROBs fully supports asymmetric architectures.

Operation

In accordance with one aspect of the present invention, one embodiment of the invention guarantees the ordering of requests with the same ID and splits a primary request into two or more secondary requests with the same ID and reassembles and reorders all responses with the same ID to the initiator. The invention is essentially different from the prior art in that there is a stage of request arbitration between the secondary request from the ROB and other requests. This is indicated in FIG. 3 by the presence of two connections to each target 306.

Referring again to FIG. 3, each of the two connections 320a and 320b to each target 306a and 306b coming from the ROB 304a and 304b is shown. The connections need not be through the ROBs 304, but must be for common NoC embodiments that implements a universal address space for initiators 302. This is because, for each initiator 302 to have the same address space mappings of targets 306, the same filtering functionality must be employed between all initiators 302 and targets 306.

In accordance with one aspect of the present invention, having multiple ROBs to implement a universal address space need not require the ROBs to be configured identically. For example, a first ROB might have a large storage array and a second ROB might have no storage at all. Storage capacity allows a larger number of pending secondary requests. With no storage, the ROB allows simultaneously pending request to only one slave for each ID. An ROB with no storage is reasonable for initiators that support fully disordered transaction requests and make infrequent requests that cross mapping boundaries.

Design Process

In accordance with various aspects of the present invention, the process of designing a NoC requires three phases. The first is definition of the specification. The specification includes the number and type of initiators and targets, their connectivity, and the mapping of targets into the address space seen by each initiator. The second phase is definition of the logical transport topology. Transactions cause the creation of packets at the initiator interfaces. After that, the packets are transported through switches, muxes, fifos, clock domain crossings, power domain crossings, and other transport topology modules. The topology comprises the interconnectivity between initiator interfaces, target interfaces, and all other transport topology modules. The third phase is the definition of the physical structure of the NoC. This is the determination of the locations of each module within the floorplan of the chip. Decisions of each phase affect the others, and optimizations in each phase are properly made simultaneously and iteratively. The advantage of the distribution of ROBs is that they can be placed anywhere in the logical transport topology as benefits the physical placement of initiators and targets.

Furthermore, groups of physically adjacent initiators can be connected in the logical transport topology to separate ROBs. By so doing, ROBs can be distributed throughout the chip floorplan and located near to groups of initiators. So doing reduces average wire length and reduces density of wiring around each ROB. Also, each ROB can be configured as just large enough to support the address mappings and number of pending requests required by its connected initiators.

Figure 8:
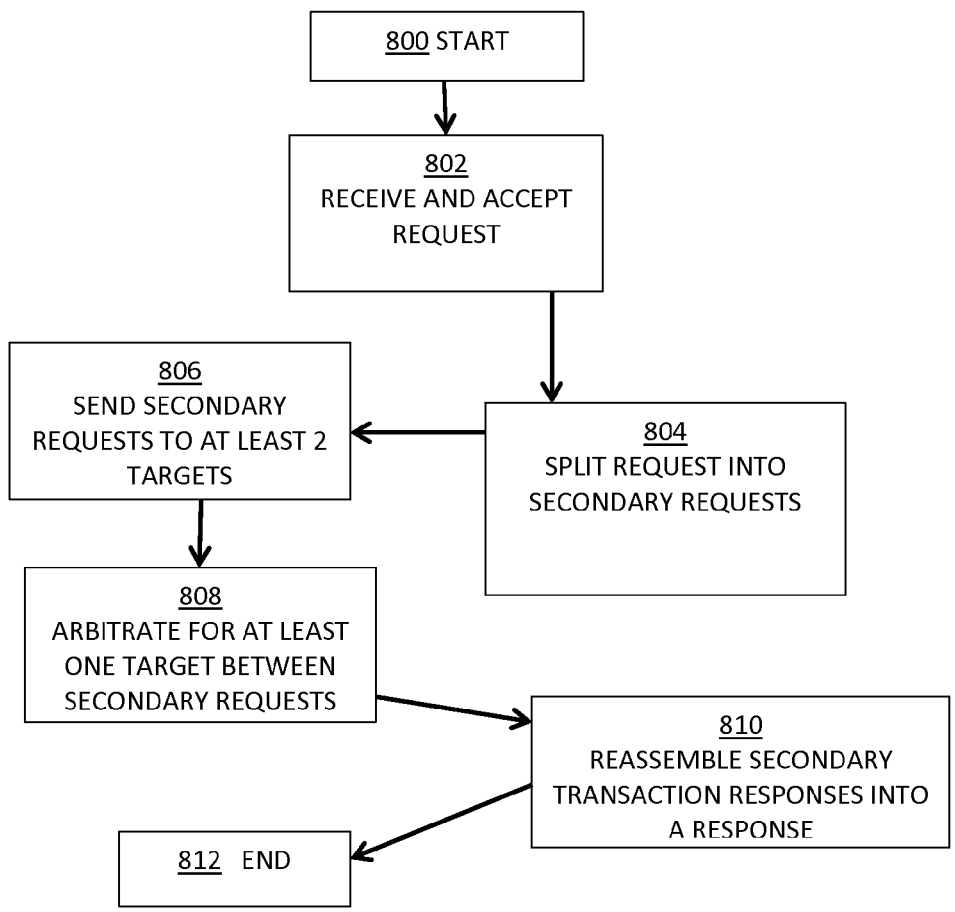
FIG. 8 illustrates a flow process for converting a request into multiple secondary requests and receiving multiple responses that are reassembled into a response.

Referring now to FIG. 8, the process of splitting a request into at least two secondary requests begin at step 800. At step 802, a request is received from an initiator. If the request spans the address range of at least two targets, the at step 804 the request is split into secondary requests that corresponds to each target. At step 806, the secondary requests are sent to each respective target. At step 808 the system arbitrates for at least one of the targets between the at least two secondary requests. Each target will then respond to the request and at step 810, the secondary responses are assembled into a response that is sent to the initiator.

What is claimed is:

1. A network on chip for performing transaction splitting and response reassembly, wherein the network on chip comprises:
   a first initiator for sending requests;
   a second initiator for sending requests;
   a first target for sending responses;
   a second target for sending responses;
   a first reorder buffer for receiving data, wherein the first reorder buffer is coupled to the first initiator, the first target, and the second target; and
   a second reorder buffer for receiving data, wherein the second reorder buffer is coupled to the second initiator, the first target, and the second target,
   wherein the second reorder buffer is physically non-adjacent to the first reorder buffer, and
   wherein an address range mapping of the first target and an address range mapping of the second target are striped.

2. The network on chip of claim 1 wherein the first reorder buffer and the second reorder buffer have different configurations.

3. The network on chip of claim 1 wherein the first target is a DRAM controller.

4. The network on chip of claim 1 wherein the first target is a wide IO interface.

5. The network on chip of claim 1 further comprising a third initiator coupled to the second reorder buffer.

6. The network on chip of claim 1 wherein the second reorder buffer includes storage.

7. The network on chip of claim 1 comprising a number of targets with striped addresses that is not a power of two.

8. A method of performing a data transfer transaction within a network on chip comprising steps of:
   accepting a primary transaction request, wherein the primary transaction request has a range that spans at least one address mapping boundary between at least two targets, wherein the primary transaction request comes from one of at least two initiators;
   splitting the primary transaction request into at least two secondary transaction requests, wherein each secondary transaction request is configured to result in at least one secondary transaction response;
   sending the at least two secondary transaction requests to the at least two targets;
   arbitrating for at least one target between at least one of the at least two secondary transaction requests and another transaction request; and
   reassembling secondary transaction responses to the at least two secondary transaction requests into a primary response to the primary transaction request.

9. The method of claim 8, wherein the primary transaction request comes from a first initiator among the at least two initiators wherein the method further comprises performing the steps simultaneously for at least another primary transaction request from a second initiator among the at least two initiators.

10. A method of designing a network-on-chip for a chip considering a floorplan, the method comprising steps of:
    determining a connectivity between at least two initiator sockets and at least two target sockets;
    determining an address map of the at least two target sockets within an address space of each of the at least two initiator sockets;
    determining a physical location of each of the at least two initiator sockets and each of the at least two target sockets, within the floorplan; and
    determining a location of a reorder buffer, inside a transport topology of connectivity between the at least two initiator sockets and the at least two target sockets; and
    determining the physical location of the reorder buffer within the floorplan.

11. The method of claim 10, wherein the reorder buffer is a first reorder buffer, the method further comprising steps of:
    determining the location of a second reorder buffer inside the transport topology of connectivity between the at least two initiator sockets and the at least two target sockets; and
    determining the physical location of the second reorder buffer within the floorplan such that the second reorder buffer is non-adjacent to the first reorder buffer.

12. The method of claim 11 further comprising steps of:
    determining a first configuration of the first reorder buffer; and
    determining a second configuration of the second reorder buffer,
    wherein the second configuration is different from the first configuration.

13. A design tool apparatus comprising:
    at least one processor; and
    at least one memory including computer program code, the at least one memory and the computer program code configured to, with the at least one processor, cause the apparatus to perform a data transfer transaction within a network-on-chip, wherein the data transfer transaction comprises steps of:
        accepting a primary transaction request of a range that spans at least one address mapping boundary between at least two targets, wherein the primary transaction request comes from one of at least two initiators;
        splitting the primary transaction request into at least two secondary transaction requests;
        sending the at least two secondary transaction requests to the at least two targets;
        arbitrating for at least one target between at least one of the at least two secondary transaction requests and another transaction request; and
        reassembling secondary transaction responses to the at least two secondary transaction requests into a response to the primary transaction request.

14. The design tool apparatus of claim 13, wherein the reassembling further comprises sending, from each of the at least two targets, one of the at least two secondary transaction responses to at least one reorder buffer, wherein the at least one reorder buffer is coupled to one initiator from the at least two initiators.

* * * * *